(12) United States Patent
Zhang et al.

(10) Patent No.: US 11,841,876 B2
(45) Date of Patent: Dec. 12, 2023

(54) MANAGING TRANSACTION SIZE DURING DATABASE REPLICATION

(71) Applicant: International Business Machines Corporation, Armonk, NY (US)

(72) Inventors: He Fang Zhang, Beijing (CN); Xue Bo, Beijing (CN); De Song Li, Beijing (CN); Wen Kui Zhou, Beijing (CN); Yin Xia, Beijing (CN); Dong Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 17/482,406

(22) Filed: Sep. 22, 2021

(65) Prior Publication Data

US 2023/0090266 A1    Mar. 23, 2023

(51) Int. Cl.
*G06F 16/00* (2019.01)
*G06F 16/27* (2019.01)
(Continued)

(52) U.S. Cl.
CPC ........ *G06F 16/273* (2019.01); *G06F 16/2379* (2019.01); *G06N 20/00* (2019.01)

(58) Field of Classification Search
CPC .... G06F 16/273; G06F 16/2379; G06F 3/065; G06F 9/466; G06F 16/27; G06N 20/00; H04L 67/1095
See application file for complete search history.

(56) References Cited

U.S. PATENT DOCUMENTS

| 8,392,387 | B2 | 3/2013 | Bourbonnais et al. |
| 8,666,942 | B2 * | 3/2014 | Ngo .................... G06F 11/1471 |
| | | | 707/684 |

(Continued)

OTHER PUBLICATIONS

A Method to handle replication for large transaction. IP.com No. IPCOM000266068D, Jun. 10, 2021. [2 printed pages] Khttps://priorart.ip.com/IPCOM/000266068>.

(Continued)

*Primary Examiner* — Noosha Arjomandi
(74) *Attorney, Agent, or Firm* — The Steadman Law Firm PLLC

(57) ABSTRACT

Techniques are described with regard to managing transaction size during a database replication process. An associated computer-implemented method includes identifying each of at least one transaction associated with at least one source database stored in a replication capture memory, identifying at least one potential excessive memory transaction by applying, via at least one machine learning pattern detection model, pattern detection to each of the at least one transaction stored in the replication capture memory, and constructing at least one compact data unit associated with each of the at least one potential excessive memory transaction. The computer-implemented method further includes facilitating compact data unit transmission to a replication apply server system in order to replicate the at least one compact data unit associated with each of the at least one potential excessive memory transaction to at least one target database via a replication apply server application.

18 Claims, 7 Drawing Sheets

(51) Int. Cl.
  *G06N 20/00*  (2019.01)
  *G06F 16/23*  (2019.01)

(56) References Cited

U.S. PATENT DOCUMENTS

| | | | |
|---|---|---|---|
| 9,317,215 B2* | 4/2016 | Chen | G06F 3/067 |
| 9,424,140 B1* | 8/2016 | Madhavarapu | G06F 11/0751 |
| 11,080,298 B2* | 8/2021 | Kumar | G06F 16/275 |
| 11,615,113 B2* | 3/2023 | Kedia | G06F 16/2358 |
| | | | 707/610 |
| 2002/0198899 A1* | 12/2002 | Yamaguchi | G06F 16/27 |
| 2004/0098425 A1* | 5/2004 | Wiss | G06F 11/2071 |
| 2010/0191884 A1* | 7/2010 | Holenstein | G06F 16/2343 |
| | | | 707/613 |
| 2012/0191680 A1 | 7/2012 | Bourbonnais et al. | |
| 2017/0139782 A1* | 5/2017 | Chen | G06F 16/27 |
| 2017/0147292 A1* | 5/2017 | Mauerer | G06F 8/33 |
| 2017/0177691 A1* | 6/2017 | Cadarette | G06F 11/1471 |
| 2018/0095841 A1* | 4/2018 | Kedia | G06F 16/2379 |
| 2018/0253463 A1* | 9/2018 | Bastawala | G06F 15/76 |
| 2019/0138644 A1* | 5/2019 | Kedia | G06F 16/27 |
| 2019/0146966 A1* | 5/2019 | Morfonios | H04L 43/0817 |
| | | | 707/753 |
| 2020/0175034 A1 | 6/2020 | Bourbonnais et al. | |
| 2020/0409908 A1* | 12/2020 | Ahn | G06F 3/0638 |
| 2021/0089529 A1* | 3/2021 | Koppuravuri | G06F 16/24542 |
| 2021/0158201 A1* | 5/2021 | Arra | G06N 20/00 |
| 2021/0303597 A1* | 9/2021 | Zhang | G06F 16/275 |
| 2021/0334246 A1* | 10/2021 | Seelemann | G06F 16/27 |
| 2022/0188325 A1* | 6/2022 | Galanis | G06F 16/24524 |
| 2022/0382651 A1* | 12/2022 | Lu | G06F 11/1471 |
| 2023/0090266 A1* | 3/2023 | Zhang | G06F 9/5016 |
| | | | 707/615 |

OTHER PUBLICATIONS

Actions to take when Q Replication latency is too high. IBM InfoSphere Data Replication 10.2.1, Accessed Jun. 29, 2021. [6 printed pages] <https://www.ibm.com/docs/en/idr/10.2.1?topic=troubleshooting-actions-take-when-replication-latency-is-too-high>.

System and Method for Granular View of Transactions for each Table in RDBMS for Enabling Replication performance Improvement and proper Repository sizing for long running transactions. IP.com No. IPCOM000256870D, Jan. 7, 2019. [3 printed pages] <https://priorart.ip.com/IPCOM/000256870>.

* cited by examiner

MANAGING TRANSACTION SIZE DURING DATABASE REPLICATION

BACKGROUND

The various embodiments described herein generally relate to database replication. More specifically, the various embodiments relate to managing transaction size during replication from at least one source database to at least one target database.

SUMMARY

The various embodiments described herein provide techniques of managing transaction size during a database replication process. An associated computer-implemented method includes identifying each of at least one transaction associated with at least one source database stored in a replication capture memory, identifying at least one potential excessive memory transaction by applying, via at least one machine learning pattern detection model, pattern detection to each of the at least one transaction stored in the replication capture memory, and constructing at least one compact data unit associated with each of the at least one potential excessive memory transaction. The computer-implemented method further includes facilitating compact data unit transmission to a replication apply server system in order to replicate the at least one compact data unit associated with each of the at least one potential excessive memory transaction to at least one target database via a replication apply server application.

One or more additional embodiments pertain to a computer program product including a computer readable storage medium having program instructions embodied therewith. According to such embodiment(s), the program instructions may be executable by a computing device to cause the computing device to perform one or more steps of and/or to implement one or more embodiments associated with the above recited computer-implemented method. One or more further embodiments pertain to a system having at least one processor and a memory storing an application program, which, when executed on the at least one processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
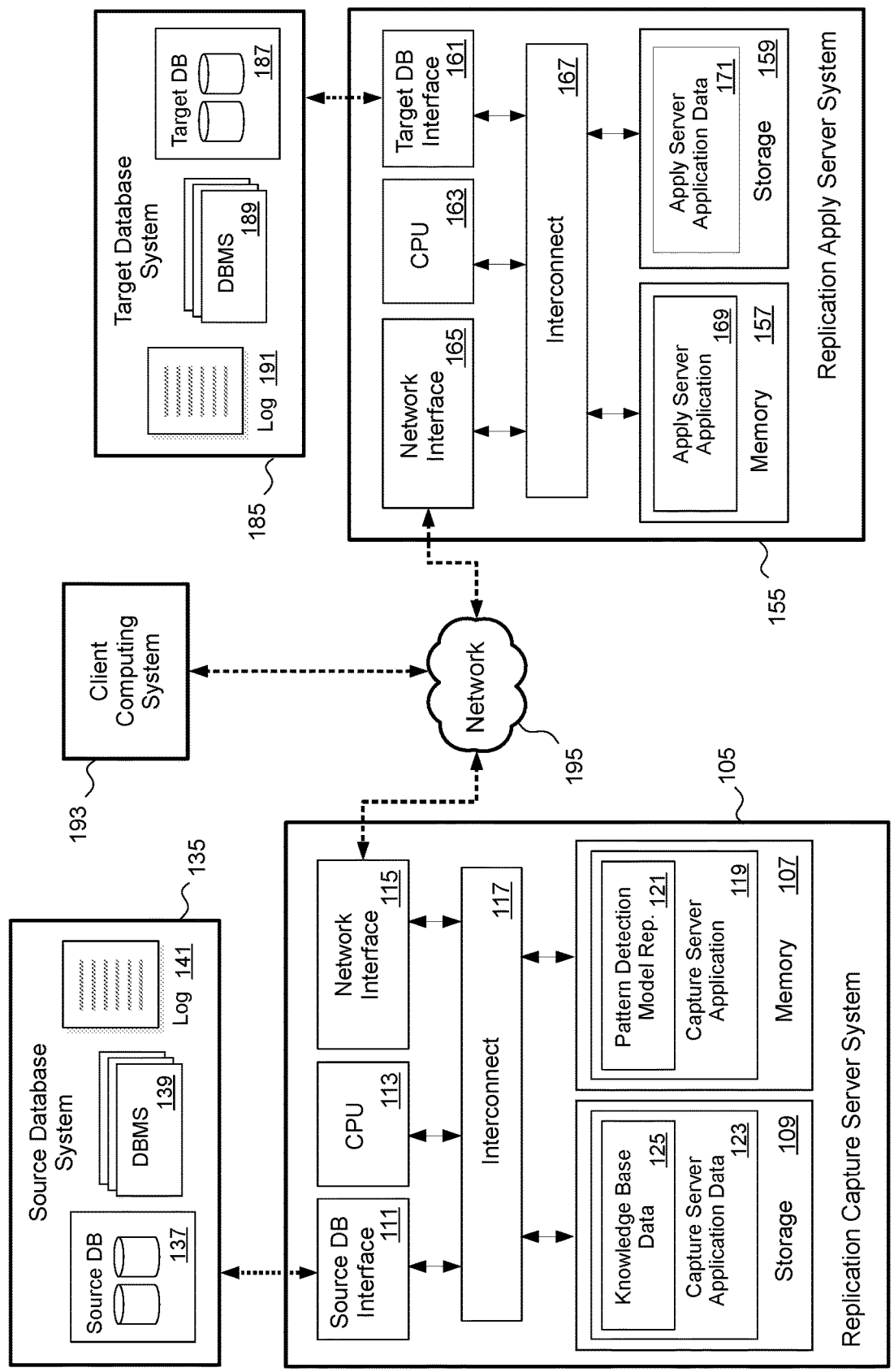
FIG. 1 illustrates a computing infrastructure, according to one or more embodiments.

The various embodiments described herein are directed to transaction size management during database replication. In the context of the various embodiments, a transaction includes a set of one or more database change operations associated with database processing. Such database change operations include, e.g., inserting, updating, and/or deleting data within respective columns of one or more database tables. In an embodiment, a replication capture server application of a replication capture server system stores database changes associated with a respective transaction, including data and/or metadata associated with database change operations. According to such embodiment, such stored database changes optionally include one or more records describing the database changes. According to such embodiment, the replication capture server application optionally stores database changes associated with a respective transaction in at least one data structure in a memory associated with the replication capture server system, e.g., a replication capture queue. In an additional embodiment, a transaction is part of a workload. In the context of the various embodiments, a workload is a collection of transactions associated with database processing having common characteristics based upon application request source, performance objectives, and/or business priority.

One or more potential excessive memory transactions, optionally associated with a certain workload, may impact memory associated with a replication capture server system excessively, thus increasing risk of replication latency. In the context of the various embodiments, a potential excessive memory transaction is a transaction associated with parsed database change data that is excessively large or is capable of becoming excessively large for storage in replication capture memory based upon current storage conditions in the replication capture memory. A transaction optionally is identified as a potential excessive memory transaction based upon predicted memory impact determined for the transaction. In certain instances, dependencies arise based upon one or more other transactions affecting operations associated with the transaction, particularly in scenarios in which the transaction involves multiple database tables. Accordingly, any such dependencies must be addressed upon applying database changes associated with the transaction and prior to committing the transaction. As further described herein, the various embodiments optionally address dependencies within a replication apply server system.

The various embodiments described herein may have advantages over conventional techniques. Specifically, the various embodiments improve computer technology by reducing or otherwise managing size of potential excessive memory transactions to minimize replication capture memory impact, thus reducing potential for database replication latency. The various embodiments apply machine learning pattern detection techniques in order to identify and address potential excessive memory transactions. The various embodiments facilitate continuous update of such pattern detection techniques by retraining at least one machine learning pattern detection model based upon actual replication results and/or client feedback. Accordingly, the various embodiments leverage machine learning to improve pattern detection capabilities. Furthermore, the various embodiments apply thresholds in the context of transaction processing, including thresholds related to resource capacity, memory impact, and/or data size, based upon replication server resource availability and/or memory availability. Though application of such thresholds, the various embodiments anticipate potential excessive memory transactions based upon incremental replication capture memory analysis. Furthermore, through application of such thresholds, the various embodiments facilitate system scalability based upon digital transformation requirements. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to database replication management. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100, according to an embodiment. As shown, computing infrastructure 100 includes a replication capture server system 105, a source database system 135, a replication apply server system 155, a target database system 185, and a client computing system 193. Replication capture server system 105, replication apply server system 155, and client computing system 193 are connected via a network 195.

Although shown as a single computing system, replication capture server system 105 is included to be representative of a single replication capture server system or multiple replication capture server systems. In an embodiment, replication capture server system 105 includes a single hardware server configured to provide replication capture hosting capabilities. In an alternative embodiment, replication capture server system 105 includes, or otherwise is operatively coupled to, a plurality of hardware and/or virtualized servers configured to provide replication capture hosting capabilities. In a further alternative embodiment, replication capture server system 105 is a cloud server system configured to provide distributed replication capture hosting capabilities via a plurality of computing nodes in a cloud computing environment. According to such further alternative embodiment, the cloud computing nodes are configured to communicate with one another. According to such further alternative embodiment, the cloud computing environment optionally offers infrastructure as a service (IaaS), platform as a service (PaaS), software as a service (SaaS), and/or other cloud computing services. Illustratively, replication capture server system 105 includes, or is otherwise operatively coupled to, a memory 107, a storage 109, a source database interface 111, a central processing unit (CPU) 113, and a replication capture server network interface 115, all of which are interconnected via interconnect 117 (e.g., a bus). One or more aspects of replication capture server system 105 are accessed or controlled by one or more database/server administrators and/or one or more database replication clients.

Memory 107 of replication capture server system 105 includes a replication capture server application 119. In an embodiment, replication capture server application 119 is an online application configured for interfacing with source database system 135, replication apply server system 155, and/or other computing systems. Replication capture server application 119 is configured to manage one or more aspects of database replication, including replication capture activities, according to the various embodiments described herein. Replication capture server application 119 includes or otherwise is operatively coupled to a machine learning pattern detection model representation 121. In an embodiment, replication capture server application 119 is configured to execute one or more artificial intelligence algorithms, e.g., utilizing one or more machine learning techniques, via machine learning pattern detection model representation 121. According to such embodiment, machine learning pattern detection model representation 121 includes or otherwise is operatively coupled to at least one machine learning pattern detection model and at least one knowledge base associated therewith. According to such embodiment, some or all aspects of the at least one pattern detection model may run within replication capture server system 105. Additionally or alternatively, some or all aspects of the at least one pattern detection model may run externally to replication capture server system 105, e.g., via a cloud-based implementation, in which case replication capture server system 105 communicates with or accesses such aspects of the at least one pattern detection model via machine learning pattern detection model representation 121. Some or all aspects of the at least one knowledge base optionally are incorporated into replication capture server system 105. Alternatively, some or all aspects of the at least one knowledge base are externally located and communicatively coupled to replication capture server system 105.

Storage 109 of replication capture server system 105 includes replication capture server application data 123 associated with replication capture server application 119. Replication capture server application data 123 optionally includes data associated with database replication from at least one source database to at least one target database, e.g., database replication from source database system 135 to target database system 185. Replication capture server application data 123 includes knowledge base data 125. Knowledge base data 125 includes data generated by, used by, or otherwise associated with the at least one machine learning pattern detection model. Knowledge base data 125 includes datapoints pertaining to transaction operation patterns, memory impact patterns, and/or transaction split patterns. Knowledge base data 125 further includes other data associated with the at least one knowledge base. Source database interface 111 facilitates communication between replication capture server system 105 and source database system 135.

Optionally, such communication is facilitated via one or more aspects of network 195. CPU 113 is included to be representative of a single CPU, multiple CPUs, a single CPU having multiple processing cores, and the like. Replication capture server network interface 115 is configured to receive data from, and transmit data to, replication apply server system 155 and/or other computing system(s) via network 195. Replication capture server application 119 is configured to accept requests sent by replication apply server system 155 or other computing system(s) to replication capture server system 105, and further is configured to transmit data to replication apply server system 155 or other computing system(s), via replication capture server network interface 115.

Source database system 135 includes at least one source database 137, a database management system (DBMS) 139, and at least one source database transaction log 141. Although two databases are depicted for illustrative purposes, the at least one source database 137 may include any number of databases. In an embodiment, the at least one source database 137 includes one or more database tables. In an additional embodiment, the at least one source database 137 includes one or more ontology trees or other ontological structures. DBMS 139 is included to be representative of a single database management system or multiple database management systems. In a further embodiment, DBMS 139 includes or otherwise is operatively coupled to at least one memory and at least one processor to facilitate database processing. DBMS 139 is configured to communicate with replication capture server application 119 and/or other components of replication capture server system 105. The at least one source database transaction log 141 includes data associated with respective source database transactions. Such data includes database change operation information associated with respective source database transactions.

Although shown as a single computing system, replication apply server system 155 is included to be representative of a single replication apply server system or multiple replication apply server systems. In an embodiment, replication apply server system 155 includes a single hardware server configured to provide replication apply hosting capabilities. In an alternative embodiment, replication apply server system 155 includes, or is otherwise operatively coupled to, a plurality of hardware and/or virtualized servers configured to provide replication apply hosting capabilities. In a further alternative embodiment, replication apply server system 155 is a cloud server system configured to provide distributed replication apply hosting capabilities via a plurality of computing nodes in a cloud computing environment. According to such further alternative embodiment, the plurality of cloud computing nodes are configured to communicate with one another. According to such further alternative embodiment, the cloud computing environment optionally offers IaaS, PaaS, SaaS, and/or other cloud computing services. Illustratively, replication apply server system 155 includes, or otherwise is operatively coupled to, a memory 157, a storage 159, a target database interface 161, a CPU 163, and a replication apply server network interface 165, all of which may be interconnected via interconnect 167 (e.g., a bus). One or more aspects of replication apply server system 155 are accessed or controlled by one or more database/server administrators and/or one or more database replication clients.

Memory 157 of replication apply server system 155 includes a replication apply server application 169 configured to facilitate database replication to at least one target database system, e.g., target database system 185. In an embodiment, replication apply server application 169 is configured to manage replication apply activities according to the various embodiments described herein. Storage 159 includes replication apply server application data 171. Replication apply server application 169 generates and processes replication apply server application data 171 based on interaction with other components of computing infrastructure 100. Target database interface 161 facilitates communication between replication apply server system 155 and target database system 185. Optionally, such communication is facilitated via one or more aspects of network 195. CPU 163 is included to be representative of a single CPU, multiple CPUs, a single CPU having multiple processing cores, and the like. Replication apply server network interface 165 is configured to receive data from and transmit data to replication capture server system 105 and/or other computing system(s) via network 195. Replication apply server application 169 is configured to accept requests sent by replication capture server system 105 or by other computing system(s) to replication apply server system 155 via replication apply server network interface 165.

Target database system 185 includes at least one target database 187, a DBMS 189, and at least one target database transaction log 191. Although two databases are depicted for illustrative purposes, the at least one target database 187 may include any number of databases. In an embodiment, the at least one source database 187 includes one or more database tables. In an additional embodiment, the at least one source database 187 includes one or more ontology trees or other ontological structures. DBMS 189 is included to be representative of a single database management system or multiple database management systems. In a further embodiment, DBMS 189 includes or otherwise is operatively coupled to at least one memory and at least one processor to facilitate database processing. DBMS 189 is configured to communicate with replication apply server application 169 and/or other components of replication apply server system 155. The at least one target database transaction log 191 includes data associated with respective target database transactions. Such data includes database change operation information associated with respective target database transactions, optionally as replicated from corresponding source database transactions.

Client computing system 193 is representative of a single client computing system or multiple client computing systems. Client computing system 193 is configured to communicate with replication capture server system 105, e.g., replication capture server application 119, and/or replication apply server system 155, e.g., replication apply server application 169, via network 195. In an embodiment, client computing system 193 is configured to send client feedback associated with database replication to replication capture server application 119 and/or to replication apply server application 169 via at least one user interface associated with a client application.

In the context of the various embodiments described herein, components of computing infrastructure 100, including respective components of replication capture server application 105 and/or replication apply server application 155, provide, or are configured to provide, a client or legal representative(s) of the client, a database or server administrator, and/or any other authorized entity associated with database replication advance notice of any personal data collection. Components of computing infrastructure 100 further provide, or further are configured to provide, any affected entity an option to opt in or opt out of any such personal data collection at any time. Optionally, components of computing infrastructure 100 further transmit, or further are configured to transmit, notification(s) to any affected entity each time any such personal data collection occurs and/or at designated time intervals.

Figure 2:
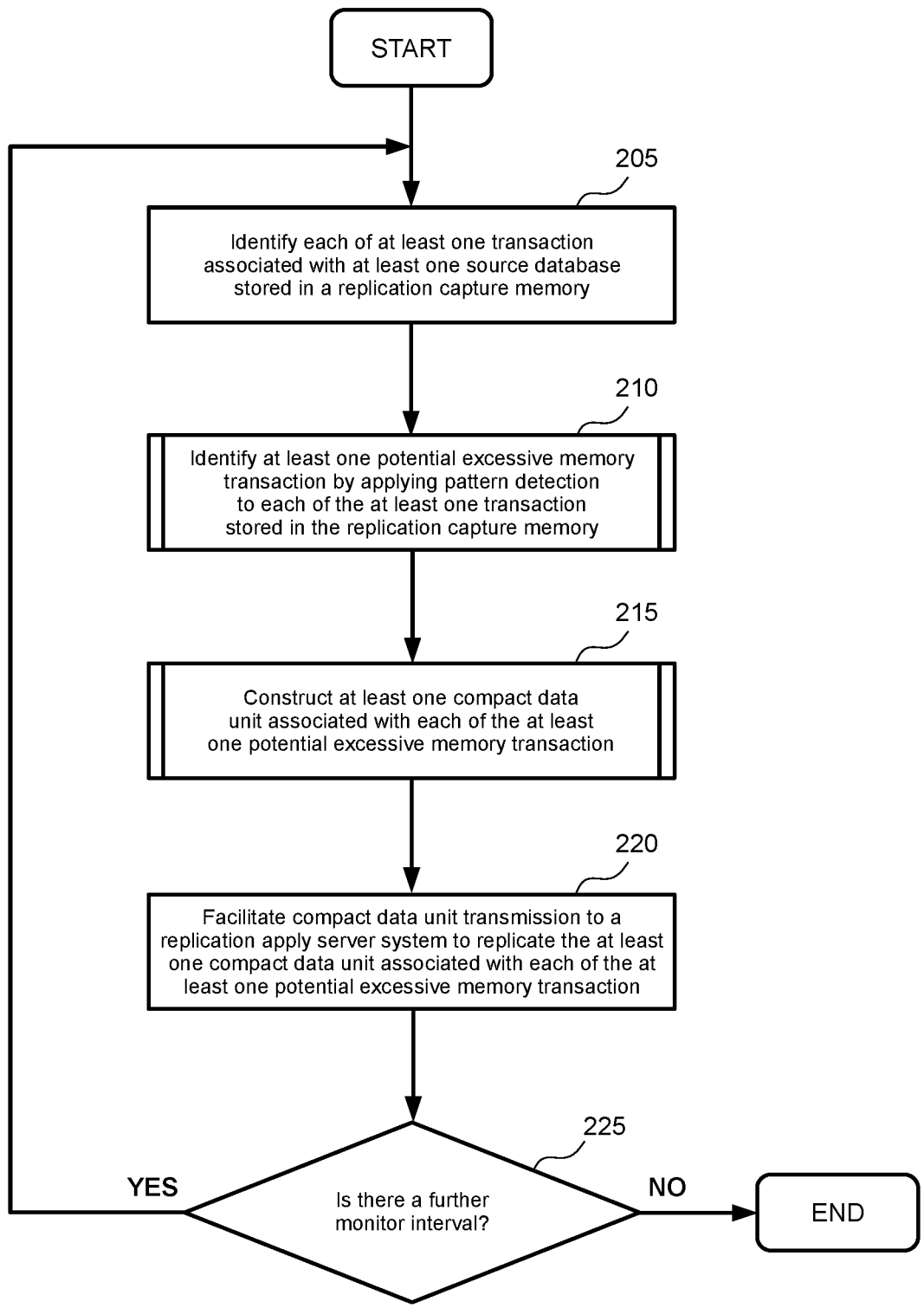
FIG. 2 illustrates a method of managing transaction size during a database replication process, according to one or more embodiments.

FIG. 2 illustrates a method 200 of managing transaction size during a database replication process. One or more steps associated with the method 200 and the other methods described herein optionally are carried out in a database replication computing environment (e.g., computing infrastructure 100) including a network (e.g., network 195). A replication capture server application in a replication capture server system of the database replication computing environment (e.g., replication capture server application 119 in replication capture server system 105 of computing infrastructure 100) facilitates processing according to the method 200. Additionally or alternatively, one or more steps associated with the method 200 and the other methods described herein optionally are carried out within one or more workloads of a cloud computing environment.

The replication capture server application execute one or more steps of the method 200 at defined monitor intervals associated with the database replication process. According to such embodiment, the replication capture server application is configured to monitor the replication capture memory at each monitor interval, e.g., at one or more specified points in time during each monitor interval or continuously during all or part(s) of each monitor interval, in order to proceed with method processing. In an embodiment, the defined monitor intervals include periodic intervals optionally selected by a database or server administrator or by a client via at least one user interface. Additionally or alternatively, the defined monitor intervals include predetermined intervals optionally selected by a database or server administrator or by a client via at least one user interface of a client application in a client computing system in communication with the replication capture server system via the network (e.g., client computing system 193). Such at least one user interface includes a graphical user interface (GUI), a command line interface (CLI), and/or a sensory interface configured to discern and process client sound/voice commands and/or client gestures.

The method 200 begins at step 205, where the replication capture server application identifies each of at least one transaction associated with at least one source database (e.g., at least one source database 137 in source database system 135) stored in a replication capture memory of the replication capture server system (e.g., memory 107 of replication capture server system 105). The at least one source database includes one or more database tables affected by change(s) applied consequent to the at least one transaction. In an embodiment, the replication capture server application identifies each of the at least one transaction by scanning the replication capture memory and detecting data associated with each of the at least one transaction. According to such embodiment, the replication capture server application optionally detects a marker and/or a data unit specifically associated with a respective transaction. In an additional embodiment, in the context of storing a respective transaction in the replication capture memory, the replication capture server application, or another application associated with the replication capture server system, parses, from at least one transaction log associated with the at least one source database (e.g., at least one transaction log 141), database change information associated with the respective transaction and stores the database change information associated with the respective transaction in at least one data structure within the replication capture memory, e.g., a replication capture queue. In the context of the various embodiments, database change information as recorded in a database transaction log includes datapoints pertaining to a database table being changed, the operators (e.g., insert, update, delete) associated with any database change, data prior to any database change, and data subsequent to any database change.

In an embodiment, responsive to determining that replication capture server resource capacity is below a designated resource threshold, the replication capture server application optionally prioritizes identification of a longest stay transaction stored in the replication capture memory longest and a maximum size transaction having a largest size in the replication capture memory. A respective transaction stored in the replication capture memory optionally is both the longest stay transaction and the maximum size transaction. The designated resource threshold optionally is provided by a database or server administrator based upon server resource availability and/or based upon tasks currently pending. Additionally or alternatively, the replication capture server application automatically calculates the designated resource threshold at least in part based upon an automatic assessment of open resource capacity within the replication capture server system.

In an embodiment, the replication capture server application identifies the at least one transaction according to step 205 only responsive to determining that replication capture memory usage is greater than or equal to a predetermined memory usage threshold. According to such embodiment, the replication capture server application proceeds to the end of the method 200 or alternatively delays execution of step 205 responsive to determining that replication capture memory usage is less than the predetermined memory usage threshold. In an additional embodiment, the replication capture server application identifies the at least one transaction according to step 205 in response to a client request received via at least one user interface of a client application in a client computing system in communication with the replication capture server system via the network. Such at least one user interface includes a GUI, a CLI, and/or a sensory interface configured to discern and process client sound/voice commands and/or client gestures.

At step 210, the replication capture server application identifies at least one potential excessive memory transaction by applying, via at least one machine learning pattern detection model (e.g., accessible via or included within machine learning pattern detection model representation 121), pattern detection to each of the at least one transaction stored in the replication capture memory as identified at step 205. According to step 210, the replication capture server application applies the pattern detection via the at least one machine learning pattern detection model to each of the at least one transaction stored in the replication capture memory in order to identify at least one potential excessive memory transaction. A potential excessive memory transaction identified according to step 210 is a transaction occupying excessive memory or capable of occupying excessive memory based upon current storage conditions in the replication capture memory. As further described herein, in an embodiment, the replication capture server application determines excessive memory occupation for a respective transaction by comparing a predicted incremental memory impact value for the respective transaction with an incremental memory impact threshold. A predicted incremental memory impact value exceeding the incremental memory impact threshold indicates possibility that the respective transaction may create a bottleneck or other disruption with respect to the replication capture memory, which may impede transaction processing and thus create replication latency.

In an embodiment, responsive to determining that replication capture server resource capacity is below the designated resource threshold, the replication capture server application optionally prioritizes applying pattern detection to the longest stay transaction and the maximum size transaction. In an additional embodiment, the at least one machine learning pattern detection model includes a future operation prediction model configured to predict one or more future operations associated with the at least one transaction stored in the replication capture memory as identified at step 205 and/or configured to predict one or more future operations associated with the longest stay transaction and/or the maximum size transaction. In a further embodiment, the at least one machine learning pattern detection model includes a memory impact model configured to predict memory impact associated with the at least one transaction stored in the replication capture memory and any predicted future operations thereof and/or configured to predict memory impact associated with the longest stay transaction and/or the maximum size transaction and any predicted future operations thereof. The memory impact model includes patterns that reflect relationships between respective transaction operations and memory, particularly the replication capture memory. The memory impact model applies such patterns in the context of determining predicted transaction memory impact. A relationship between a respective transaction operation and memory describes how an operation is stored in memory, how much memory space is required for such operation, and/or optionally how such operation is stored in memory relative to other operations. As further described herein, the memory impact model optionally considers one or more additional transaction factors in the context of determining predicted transaction memory impact. A method of identifying the at least one potential excessive memory transaction in accordance with step 210 is described with respect to FIG. 3.

At step 215, the replication capture server application constructs at least one compact data unit associated with each of the at least one potential excessive memory transaction. In the context of the various embodiments described herein, a compact data unit is a data unit that is transmissible between a replication capture server system (e.g., the replication capture server system as discussed in the context of the method 200) and a replication apply server system (e.g., a replication apply server system as discussed below in the context of the method 200) without requiring a split or another form of size reduction. According to step 215, the replication capture server application constructs at least one compact data unit for each of the at least one potential excessive memory transaction in order to enable transmission of the at least one potential excessive memory transaction while reducing potential for replication latency. A method of constructing the at least one compact data unit associated with each of the at least one potential excessive memory transaction in accordance with step 215 is described with respect to FIG. 4.

At step 220, the replication capture server application facilitates compact data unit transmission to a replication apply server system (e.g., replication apply server system 155) in order to replicate the at least one compact data unit associated with each of the at least one potential excessive memory transaction to at least one target database (e.g., at least one target database 187 in source database system 185) via a replication apply server application (e.g., replication apply server application 169 of replication apply server system 155). According to step 220, the replication capture server application facilitates transmission of the at least one compact data unit associated with each of the at least one potential excessive memory transaction as constructed at step 215 to the replication apply server system. In an embodiment, the replication capture server application facilitates transmission by sending to the replication apply server system the at least one compact data unit associated with each of the at least one potential excessive memory transaction via a replication capture server system network interface (e.g., replication capture server network interface 115). The at least one target database includes one or more database tables to which database table change(s) associated with transactions originating at the at least one source database are replicated consequent to the database replication process. By constructing and facilitating transmission of the at least one compact data unit according to steps 215 and 220, the replication capture server application reduces potential end-to-end replication latency by reducing likelihood that a potential excessive memory transaction impedes database replication processing. A method of replicating the at least one compact data unit associated with each of the at least one potential excessive memory transaction to the at least one target database via the replication apply server application in the context of step 220 is described with respect to FIG. 6.

At step 225, the replication capture server application determines whether there is a further monitor interval associated with the database replication process. Responsive to determining that there is a further monitor interval, the replication capture server application returns to step 205 to repeat steps of the method 200 for the further monitor interval. Accordingly, the replication capture server application identifies each of at least one transaction stored in the replication capture memory (or identifies the longest stay transaction and the maximum size transaction responsive to determining that replication capture server resource capacity is below the designated resource threshold) at each successive monitor interval and executes further steps of the method 200 based upon each transaction among the at least one transaction (or based upon the longest stay transaction and the maximum size transaction) identified at each successive monitor interval. Responsive to determining that there is no further monitor interval, the replication capture server application proceeds to the end of the method 200.

Figure 3:
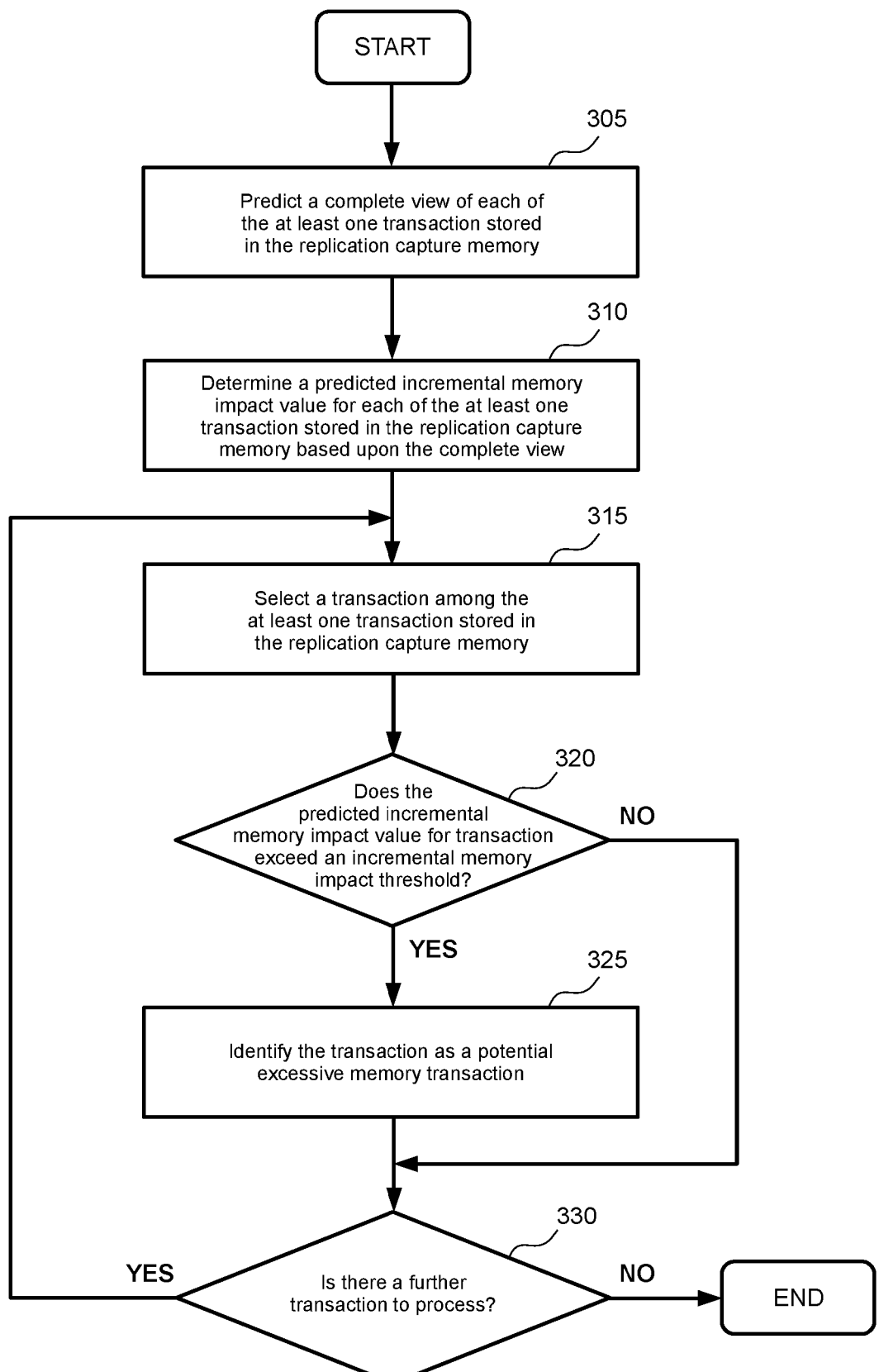
FIG. 3 illustrates a method of identifying at least one potential excessive memory transaction, according to one or more embodiments.

FIG. 3 illustrates a method 300 of identifying the at least one potential excessive memory transaction. The method 300 provides one or more embodiments with respect to step 210 of the method 200. The method 300 begins at step 305, where the replication capture server application predicts, via the future operation prediction model among the at least one machine learning pattern detection model, a complete view of each of the at least one transaction stored in the replication capture memory. The complete view of a respective transaction may be unknown and thus must be predicted by the future operation prediction model due to incremental execution of database changes associated with the respective transaction, and corresponding incremental storage of such database changes in the replication capture memory, over a period of time. In an embodiment, the complete view of a respective transaction includes at least one predicted operation in addition to any operation already identified by the replication capture server application, i.e., any operation already stored in the replication capture memory. According to such embodiment, the at least one predicted operation of the respective transaction optionally includes one or more operations predicted to follow already identified operations associated with the respective transaction. In an additional embodiment, the complete view includes any predicted transaction dependency associated with a respective transaction. According to such additional embodiment, a predicted transaction dependency optionally includes dependency information between the respective transaction and one or more other transactions associated with the at least one source database. Optionally, a transaction dependency occurs between or among transactions in a single workload. Additionally or alternatively, a transaction dependency occurs between or among transactions in different respective workloads.

In an embodiment, input to the future operation prediction model includes database statistics as provided by database engine(s) associated with the at least one source database. The database statistics optionally include historical data trends associated with one or more past-replicated transactions. The future operation prediction model analyzes such historical data trends in order to derive one or more transaction operation patterns. In a further embodiment, input to the future operation prediction model includes data from the at least one transaction log associated with the at least one source database. Such database statistics and/or transaction log data optionally include data regarding operation order and/or operation size associated with respective transactions. In a further embodiment, input to the future operation prediction model includes client input with respect to one or more transactions. As further described herein, such client input optionally includes client feedback associated with future operation prediction model output. In a further embodiment, responsive to determining that replication capture server resource capacity is below the designated resource threshold, the replication capture server application optionally prioritizes predicting the complete view of the longest stay transaction and the maximum size transaction.

In an embodiment, the replication capture server application predicts the complete view via the future operation prediction model according to step 305 by predicting one or more subsequent transaction operations based upon already known transaction operation patterns. For example, based upon transaction operations A, B, and C, the replication capture server application may predict via the future operation prediction model a transaction operation D to follow operations A, B, and C based upon a model operation pattern ABCD, such that the predicted complete view includes transaction operations A, B, C, and D. Specifically, the future operation prediction model analyzes transaction operations and generates the complete view prediction based upon the transaction operation patterns. In an additional embodiment, the future operation prediction model generates and stores new transaction operation prediction data and/or updates existing transaction operation prediction data based upon comparing predicted transaction operations to actual transaction operations received for storage at the replication capture memory and by analyzing any client feedback received based upon such operation prediction(s). Client feedback may improve model accuracy by reconciling differences between the predicted transaction operations and the actual transaction operations received. For instance, in the context of the aforementioned example, the actual transaction operation received may be operation E rather than predicted transaction operation D, such that the actual transaction operation pattern is ABCE rather than the predicted transaction operation pattern of ABCD. Based upon comparison of a predicted transaction operation pattern and an actual transaction operation pattern and/or based upon any associated client feedback, the replication capture server application optionally retrains or facilitates retraining of the future operation prediction model. In a related embodiment, the future operation prediction model generates new transaction operation pattern(s) and/or updates existing transaction operation pattern(s) consequent to retraining. In a further embodiment, the future operation prediction model generates and stores new dependency data and/or updates existing dependency data by comparing predicted dependencies to actual dependencies and/or by analyzing any client feedback received based upon such dependency prediction(s). Based upon comparison of a predicted dependency pattern and an actual dependency pattern and/or based upon any associated client feedback, the replication capture server application optionally retrains or facilitates retraining of the future operation prediction model. In a related embodiment, the future operation prediction model generates new dependency pattern(s) and/or updates existing dependency pattern(s) consequent to retraining. In a further embodiment, the replication capture server application optionally receives client feedback from at least one user interface of a client application in a client computing system in communication with the replication capture server system via the network. Such at least one user interface includes a GUI, a CLI, and/or a sensory interface configured to discern and process client sound/voice commands and/or client gestures.

At step 310, the replication capture server application determines, via the memory impact model among the at least one machine learning pattern detection model, a predicted incremental memory impact value for each of the at least one transaction stored in the replication capture memory based upon the complete view predicted according to step 305. In an embodiment, input to the memory impact model with regard to a respective transaction among the at least one transaction stored in the replication capture memory includes the predicted complete view for the respective transaction, including the predicted operation pattern for the respective transaction, and table status of any source database associated with the respective transaction, including metadata regarding particular database table columns, e.g., a quantity of database table columns affected by the respective transaction, change status of such columns, data types of such columns, etc. In an additional embodiment, input to the memory impact model includes client input with respect to one or more transactions. As further described herein, such client input optionally includes client feedback associated with memory impact model output. In a further embodiment, responsive to determining that replication capture server resource capacity is below the designated resource threshold, the replication capture server application optionally prioritizes determining a predicted incremental memory impact value for each of the longest stay transaction and the maximum size transaction.

In an embodiment, the replication capture server application determines a predicted incremental memory impact value for a respective transaction via the memory impact model according to step 310 by quantitatively predicting incremental effect of memory impact of already existing transaction operations combined with memory impact of any predicted future operations. In a related embodiment, the predicted incremental memory impact value is an estimated amount of incremental storage in the replication capture memory impacted based upon memory impact of already existing transaction operations combined with memory impact of any predicted future operations. In a further related embodiment, to obtain the predicted incremental memory impact value for a respective transaction, the memory impact model applies supervised learning to an operation pattern included in the complete view of the respective transaction in order to determine quantitative memory impact of both current transaction operations and any predicted transaction operations based upon current conditions in the replication capture memory. According to such related embodiment, the replication capture server application provides, or facilitates provision of, such operation pattern to the memory impact model as an input vector. In the aforementioned example, given a predicted model operation pattern ABCD predicting a transaction operation D following transaction operations A, B, and C, the replication capture server application may predict via the memory impact model memory impact of transaction operation D combined with memory impact of transaction operations A, B, and C in view of source database table status. Accordingly, the replication capture server application may determine the predicted incremental memory impact value for such transaction based upon incremental effect of memory impact of transaction operation D combined with memory impact of transaction operations A, B, and C. In a further related embodiment, the memory impact model incorporates one or more additional transaction factors in the context of determining the predicted incremental memory impact value for a respective transaction. Such additional transaction factors optionally include transaction latency, transaction priority, and/or characteristics of source database table columns affected by the respective transaction. Such database table column characteristics optionally include a number of database table columns associated with the respective transaction and a data type associated with each column. In a further embodiment, the memory impact model generates and stores new memory impact data and/or updates existing memory impact data by comparing predicted memory impact to actual memory impact observed and/or by analyzing any client feedback received based upon such memory impact prediction(s). Client feedback may improve model accuracy by reconciling differences between the predicted memory impact and actual memory impact observed for a respective transaction. In the context of the aforementioned example, the actual memory impact of transaction operation D as observed may differ from the predicted memory impact of transaction operation D. Based upon comparison of a predicted pattern of memory impact and an actual pattern of memory impact observed and/or based any associated client feedback, the replication capture server application optionally retrains or facilitates retraining of the memory impact model. In a related embodiment, the future operation prediction model generates new memory impact pattern(s) and/or updates existing memory impact pattern(s) consequent to retraining.

At step 315, the replication capture server application selects a transaction among the at least one transaction stored in the replication capture memory for potential excessive memory transaction analysis. At step 320, the replication capture server application determines whether the predicted incremental memory impact value for the transaction selected at step 315 exceeds an incremental memory impact threshold. Responsive to determining that the predicted incremental memory impact value for the selected transaction exceeds the incremental memory impact threshold, at step 325 the replication capture server application identifies the selected transaction as a potential excessive memory transaction. Responsive to determining that the predicted incremental memory impact value for the selected transaction does not exceed the incremental memory impact threshold, the replication capture server application proceeds directly to step 330. At step 330, the replication capture server application determines whether there is a further transaction to process among the at least one transaction stored in the replication capture memory. Responsive to determining that there is a further transaction to process, the replication capture server application returns to step 315 to select a further transaction. Responsive to determining that there no further transaction to process, the replication capture server application proceeds to the end of the method 300.

According to steps 315-330, the replication capture server application identifies any transaction among at least one transaction stored in the replication capture memory as a potential excessive memory transaction responsive to determining that the predicted incremental memory impact value for the transaction exceeds an incremental memory impact threshold. In an embodiment, the replication capture server application calculates the incremental memory impact threshold based upon an amount of storage available in the replication capture memory. In order to ensure an accurate reflection of current replication capture memory conditions, the replication capture server application optionally calculates (or recalculates) the incremental memory impact threshold during each defined monitor interval, e.g., during each monitor interval upon identification of the at least one transaction stored in the replication capture memory. Additionally or alternatively, the replication capture server application optionally calculates (or recalculates) the incremental memory impact threshold each time a transaction is updated in and/or added to the replication capture memory. According to such embodiment, the replication capture server application dynamically adjusts the incremental memory impact threshold during each successive monitor interval to reflect current storage conditions in the replication capture memory. Optionally, the replication capture server application allows a designated margin between a value of the incremental memory impact threshold and an amount of storage available in the replication capture memory, such that the incremental memory impact threshold is a designated percentage of the amount of storage available. The replication capture server application optionally sets the designated margin as a percentage of the amount of storage available in the replication capture memory. For instance, assuming a replication capture memory having a 100 MB capacity with multiple transactions occupying 95 MB of the 100 MB capacity, the replication capture server application may designate a 20% margin between a value of the incremental memory impact threshold and the 5 MB available storage in memory. Based upon such 20% margin, the replication capture server application may calculate the incremental memory impact threshold to be a 80% of the 5 MB remaining, such that the incremental memory impact threshold is calculated to be 4 MB based upon current storage conditions. Therefore, according to the method 300, based upon the incremental memory impact threshold calculated at 4 MB, the replication capture server application may identify as a potential excessive memory transaction any transaction having a predicted incremental memory impact value exceeding 4 MB based upon current replication capture memory conditions.

In an embodiment, responsive to determining that replication capture server resource capacity is below the designated resource threshold, the replication capture server application optionally prioritizes identifying the longest stay transaction or the maximum size transaction as a potential excessive memory transaction responsive to determining that the predicted incremental memory impact value for the longest stay transaction or the maximum size transaction exceeds the incremental memory impact threshold. According to such embodiment, the replication capture server application optionally executes steps 315-330 only with respect to the longest stay transaction and/or the maximum size transaction instead of with respect to each of the at least one transaction stored in the replication capture memory. In an additional embodiment, responsive to determining that no transaction among at least one transaction stored in the replication capture memory has a predicted incremental memory impact value exceeding the incremental memory impact threshold, the replication capture server application optionally identifies as a potential excessive memory transaction a single transaction among at least one transaction stored in the replication capture memory having a highest predicted incremental memory impact value.

In sum, identifying the at least one potential excessive memory transaction according to the method 300 includes predicting, via a future operation prediction model among the at least one machine learning pattern detection model, a complete view of each of the at least one transaction stored in the replication capture memory, the complete view including at least one predicted operation. The method 300 further includes determining, via a memory impact model among the at least one machine learning pattern detection model, a predicted incremental memory impact value for each of the at least one transaction stored in the replication capture memory based upon the complete view. The method 300 further includes identifying any transaction among the at least one transaction stored in the replication capture memory as a potential excessive memory transaction responsive to determining that the predicted incremental memory impact value for the transaction exceeds an incremental memory impact threshold.

Figure 4:
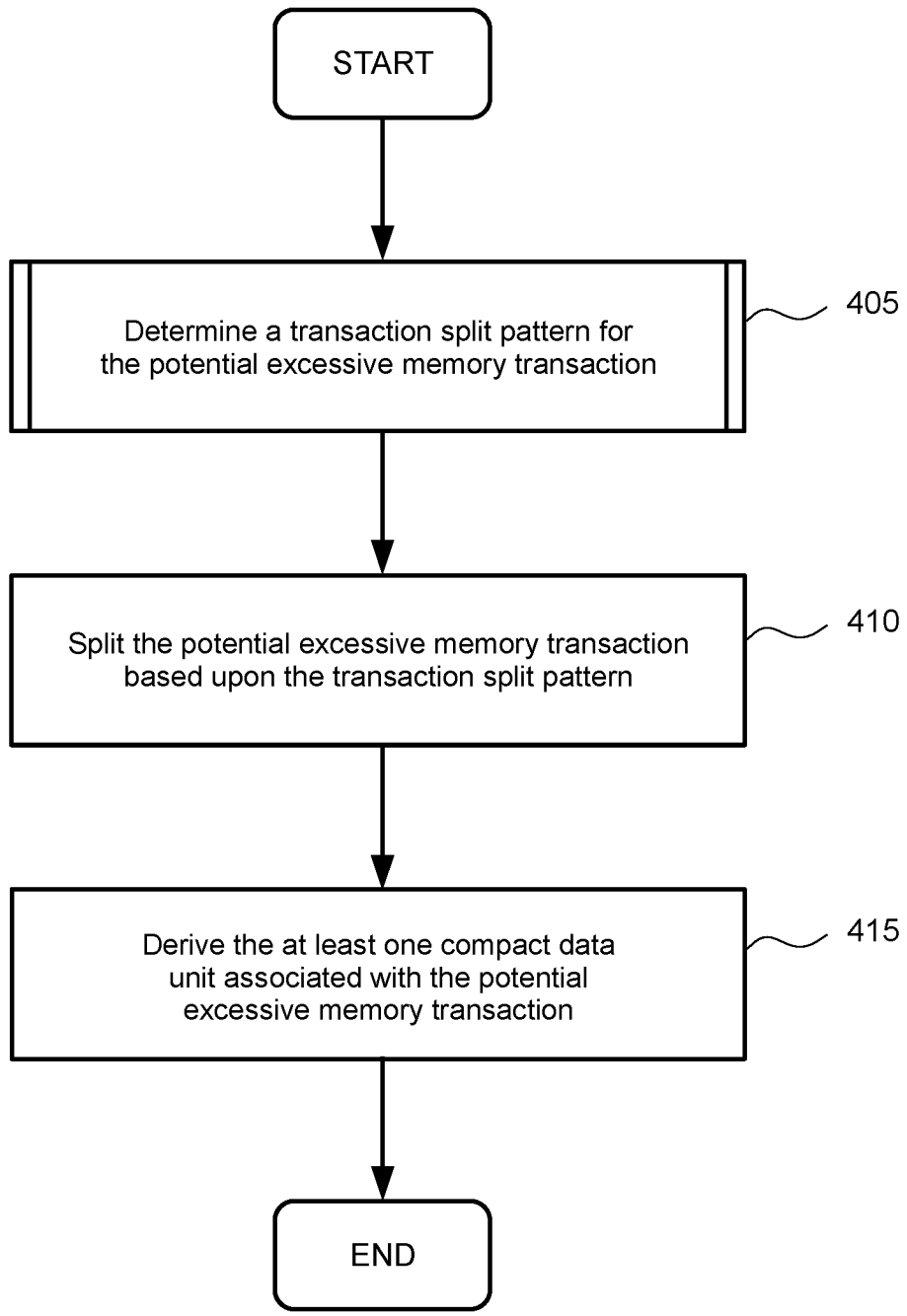
FIG. 4 illustrates a method of constructing at least one compact data unit associated with each of at least one potential excessive memory transaction, according to one or more embodiments.

FIG. 4 illustrates a method 400 of constructing the at least one compact data unit associated with each of the at least one potential excessive memory transaction. The method 400 provides one or more embodiments with respect to step 215 of the method 200. The method 400 begins at step 405, where the replication capture server application determines a transaction split pattern for the potential excessive memory transaction. In an embodiment, the replication capture server application determines the transaction split pattern only responsive to determining that a data size of the potential excessive memory transaction exceeds a predetermined data size threshold. In the context of the various embodiments, a data size of a transaction is an amount of data, e.g., database change information, associated with the transaction stored in the replication capture memory. In a related embodiment, the replication capture server application determines the predetermined data size threshold is at least in part based upon database client input, e.g., input received via at least one user interface of a client application in a client computing system in communication with the replication capture server system via the network. In an additional related embodiment, the replication capture server application determines the predetermined data size threshold based upon amount of available storage in the replication capture memory. In a further related embodiment, the replication capture server application adjusts the predetermined data size threshold dynamically based upon fluctuations in available storage in the replication capture memory. A method of determining the transaction split pattern for the potential excessive memory transaction in accordance with step 405 is described with respect to FIG. 5.

At step 410, the replication capture server application splits the potential excessive memory transaction based upon the transaction split pattern determined according to step 405. In an embodiment, the replication capture server application splits the potential excessive memory transaction based upon the determined transaction split pattern only responsive to determining that the data size of the potential excessive memory transaction exceeds the predetermined data size threshold previously discussed with respect to step 405. In a further embodiment, the replication capture server application splits the potential excessive memory transaction such that each respective split segment of the potential excessive memory transaction does not exceed a designated percentage of the predetermined data size threshold. For instance, responsive to determining that the data size of the potential excessive memory transaction exceeds a predetermined data size threshold of 50 MB, the replication capture server application may split the potential excessive memory transaction such that each respective split segment does not exceed 50% of the predetermined data size threshold, i.e., 25 MB. In a related embodiment, a database or server administrator selects the designated percentage of the predetermined data size threshold. In a further related embodiment, a database client may select the designated percentage of the predetermined data size threshold, e.g., via at least one user interface.

At step 415, the replication capture server application derives the at least one compact data unit associated with the potential excessive memory transaction. In an embodiment, the replication capture server application derives the at least one compact data unit for the potential excessive memory transaction by reformatting database change information stored in the replication capture memory for the potential excessive memory transaction to at least one open standard file format. According to such embodiment, the at least one open standard file format optionally includes JavaScript Object Notation (JSON). Additionally or alternatively, according to such embodiment, the at least one open standard file format optionally includes Extensible Markup Language (XML). According to such embodiment, the replication capture server application reformats the database change information stored for the potential excessive memory transaction in preparation for transmission to the replication apply server system.

In an embodiment, deriving the at least one compact data unit based upon the transaction split completed according to step 410 includes deriving a respective compact data unit for each split segment of the potential excessive memory transaction. In an alternative embodiment, deriving the at least one compact data unit based upon the transaction split includes deriving a respective compact data unit including one or more of the split segments of the potential excessive memory transaction, e.g., such that a respective compact data unit optionally includes multiple split segments. Such alternative embodiment may be of particular relevance in the event that there are multiple split segments of relatively small size. According to an embodiment in which the replication capture server application splits the potential excessive memory transaction based upon the transaction split pattern only responsive to determining that the data size of the potential excessive memory transaction exceeds the predetermined data size threshold, responsive to determining that the predetermined data size threshold is exceeded, the replication capture server application derives the at least one compact data unit associated with the potential excessive memory transaction based upon the transaction split. Conversely, responsive to determining that the predetermined data size threshold is not exceeded, the replication capture server application derives the at least one compact data unit without splitting the potential excessive memory transaction.

In sum, constructing the at least one compact data unit associated with each of the at least one potential excessive memory transaction according to the method 400 includes determining a transaction split pattern for the potential excessive memory transaction, splitting the potential excessive memory transaction based upon the transaction split pattern, and deriving the at least one compact data unit associated with the potential excessive memory transaction.

Figure 5:
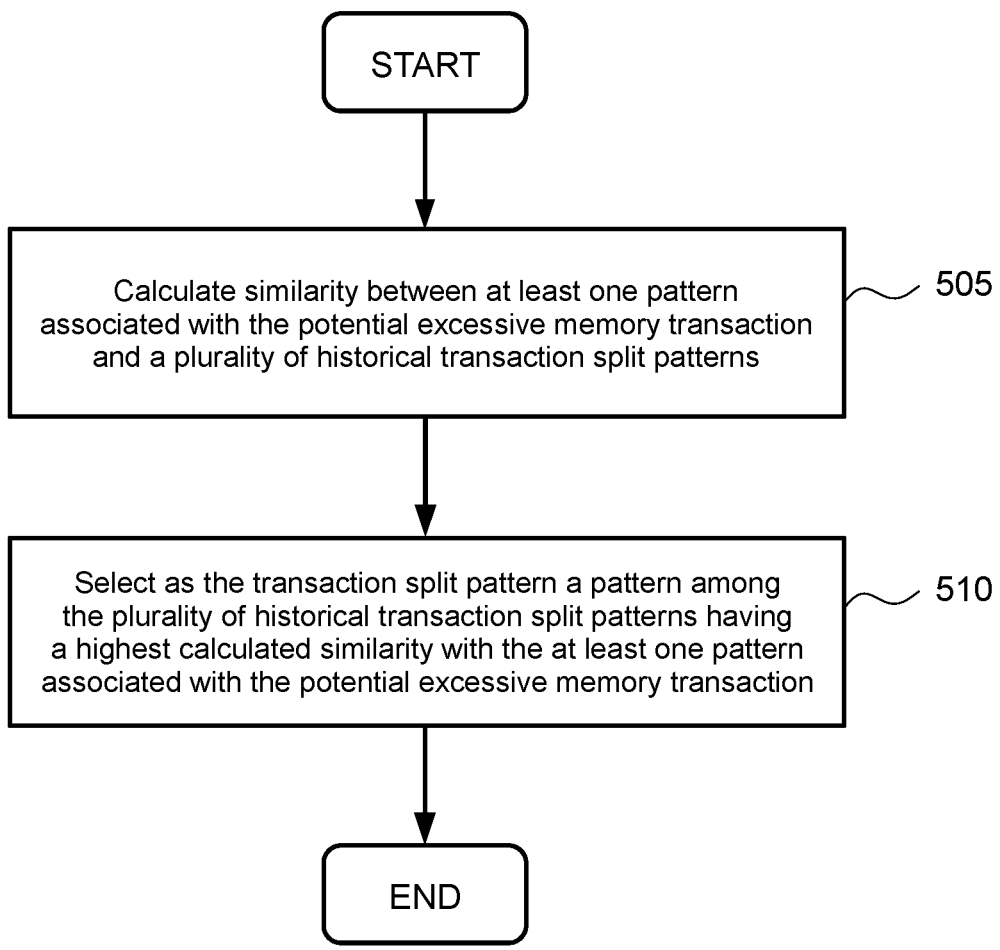
FIG. 5 illustrates a method of determining a transaction split pattern for a potential excessive memory transaction, according to one or more embodiments.

FIG. 5 illustrates a method 500 of determining the transaction split pattern for the potential excessive memory transaction. The method 500 provides one or more embodiments with respect to step 405 of the method 400. The method 500 begins at step 505, where the replication capture server application calculates similarity between at least one pattern associated with the potential excessive memory transaction and a plurality of historical transaction split patterns. In an embodiment, the replication capture server application retrieves one or more of the plurality of historical transaction split patterns from a transaction split model among the at least one machine learning pattern detection model. In an additional embodiment, input to the transaction split model includes database statistics as provided by database engine(s) associated with the at least one source database. The database statistics optionally include historical data trends associated with one or more past-replicated transactions. The transaction split model analyzes such historical data trends in order to derive one or more historical transaction split patterns. In a further embodiment, input to the transaction split model includes data from the at least one transaction log associated with the at least one source database. Such database statistics and/or transaction log data optionally include data regarding operation order and/or operation size associated with respective transactions. In a further embodiment, input to the transaction split model includes client input with respect to one or more transactions. As further described herein, such client input optionally includes client feedback associated with transaction split model output. Based upon such input, the transaction split model derives one or more of the plurality of historical transaction split patterns, which optionally are stored in a model knowledge base or a data repository configured to store such patterns. In a further embodiment, the replication capture server application calculates pattern similarity between at least one pattern associated with the potential excessive memory transaction and historical transaction split patterns via cosine similarity. According to such further embodiment, the replication capture server application applies a cosine similarity technique by deriving a respective feature vector corresponding to pattern dimensions associated with the potential excessive memory transaction, deriving respective feature vector(s) corresponding to pattern dimensions associated with historical transaction split pattern data, and comparing the derived potential excessive memory transaction feature vector to any derived historical split pattern feature vector. Comparison may result in a numerical similarity, optionally normalized to a percentage or a value on a predefined scale, e.g., a decimal scale between 0.0 and 1.0 and an integer scale between 0 and 100.

At step 510, the replication capture server application selects as the transaction split pattern a pattern among the plurality of historical transaction split patterns having a highest calculated similarity with the at least one pattern associated with the potential excessive memory transaction.

In an embodiment, the replication capture server application adapts the selected transaction split pattern via the transaction split model in order to determine an operation split technique for the potential excessive memory transaction. For example, given potential excessive memory transaction operations A, B, and C, and given that operations A and B are smaller than operation C, the replication capture server application via the transaction split model may select as the transaction split pattern a historical transaction split pattern that splits a larger transaction from two smaller transactions, responsive to determining that such historical transaction split pattern has a highest calculated similarity with the operation pattern associated with the potential excessive memory transaction. Based upon such selected historical transaction split pattern, the replication capture server application via the transaction split model may determine an operation split technique AB/C, such that transaction operations A and B are split from operation C.

In a further embodiment, the transaction split model generates and stores new pattern split data and/or updates existing pattern split data by analyzing actual results of transaction splitting according to the selected transaction split pattern and/or by analyzing any client feedback received based upon the transaction split pattern. Client feedback may improve model accuracy by reconciling differences between any predicted transaction split results and actual transaction split results observed. Based upon comparison of predicted transaction split results and actual transaction split results observed and/or based upon any associated client feedback, the replication capture server application optionally retrains or facilitates retraining of the transaction split model. In a related embodiment, the transaction split model generates new transaction split pattern(s) and/or updates existing transaction split pattern(s) consequent to retraining. In an additional embodiment, the replication capture server application selects the transaction split pattern according to step 510 at least in part based upon client input received via at least one user interface of a client application in a client computing system in communication with the replication capture server system via the network. Such at least one user interface includes a GUI, a CLI, and/or a sensory interface configured to discern and process client sound/voice commands and/or client gestures. In the context of selecting the transaction split pattern at step 510, the replication capture server application optionally considers such client input in addition to, or instead of, the similarity calculation completed at step 505.

In sum, determining the transaction split pattern for the potential excessive memory transaction according to the method 500 includes calculating similarity between at least one pattern associated with the potential excessive memory transaction and a plurality of historical transaction split patterns and selecting as the transaction split pattern a pattern among the plurality of historical transaction split patterns having a highest calculated similarity with the at least one pattern associated with the potential excessive memory transaction.

Figure 6:
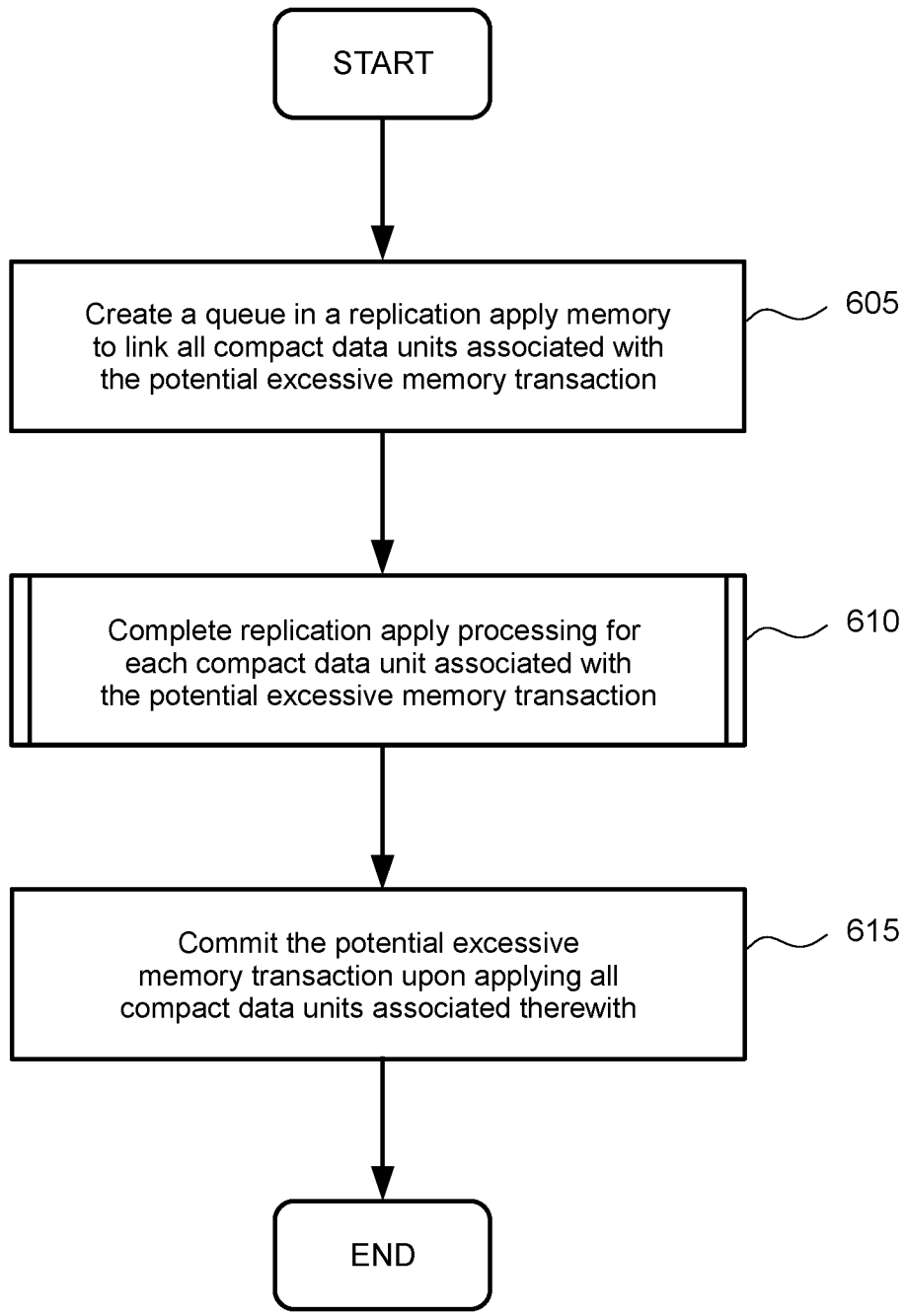
FIG. 6 illustrates a method of replicating at least one compact data unit associated with each of at least one potential excessive memory transaction to at least one target database via a replication apply server application, according to one or more embodiments.

FIG. 6 illustrates a method 600 of replicating the at least one compact data unit associated with each of the at least one potential excessive memory transaction to the at least one target database via the replication apply server application. The method 600 provides one or more embodiments in the context of step 220 of the method 200. The method 600 begins at step 605, where the replication apply server application creates a queue in a replication apply memory of the replication apply server system (e.g., memory 157 of replication apply server system 155) to link all compact data units among the at least one compact data unit associated with the potential excessive memory transaction. The replication capture server application sends compact data units associated with the potential excessive memory transaction to the replication apply server system for application to the at least one target database before the transaction is committed, and according to step 605 the replication apply server application enqueues such compact data units. At step 610, the replication apply server application completes replication apply processing for each compact data unit among the at least one compact data unit associated with the potential excessive memory transaction. A method of completing replication apply processing for each compact data unit associated with the potential excessive memory transaction in accordance with step 610 is described with respect to FIG. 7.

At step 615, replication apply server application commits the potential excessive memory transaction upon applying to the at least one target database all compact data units among the at least one compact data unit associated with the potential excessive memory transaction. In an embodiment, the replication apply server application updates at least one transaction log associated with the at least one target database based upon the applied database changes upon committing the potential excessive memory transaction. According to the various embodiments, the replication apply server application completes replication of database changes for a transaction by applying all database changes and then committing the entire transaction only upon applying all of the database changes.

In sum, replicating the at least one compact data unit associated with each of the at least one potential excessive memory transaction to the at least one target database via the replication apply server application according to the method 600 includes creating a queue in a replication apply memory of the replication apply server system to link all compact data units among the at least one compact data unit associated with the potential excessive memory transaction, completing replication apply processing for each compact data unit among the at least one compact data unit associated with the potential excessive memory transaction, and committing the potential excessive memory transaction upon applying to the at least one target database all compact data units among the at least one compact data unit associated with the potential excessive memory transaction.

Figure 7:
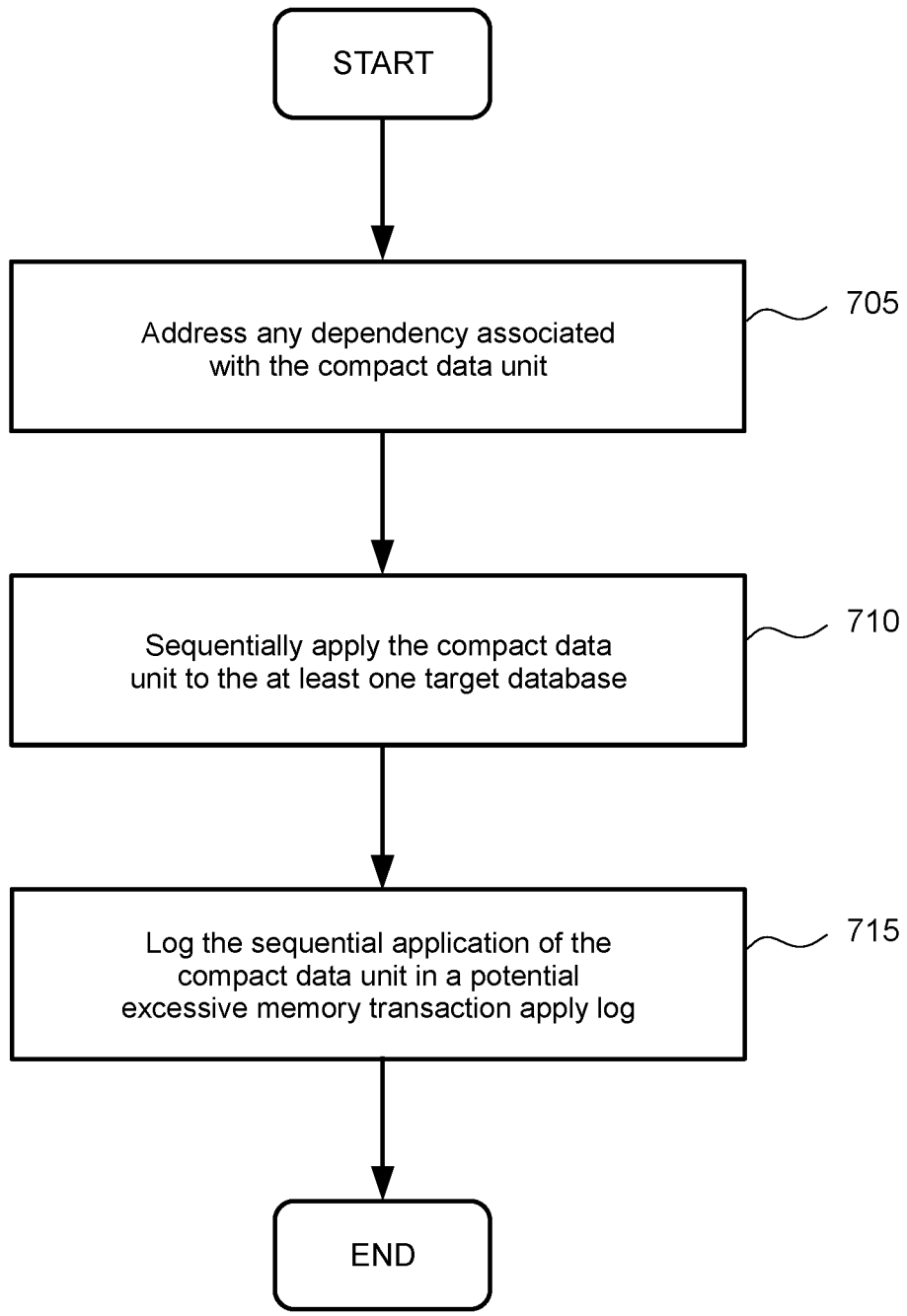
FIG. 7 illustrates a method of completing replication apply processing for each compact data unit associated with a potential excessive memory transaction, according to one or more embodiments.

FIG. 7 illustrates a method 700 of completing replication apply processing for each compact data unit among the at least one compact data unit associated with the potential excessive memory transaction. The method 700 provides one or more embodiments in the context of step 610 of the method 600. The method 700 begins at step 705, where the replication apply server application addresses any dependency associated with the compact data unit. In an embodiment, the replication apply server application addresses any dependency associated with the compact data unit by ensuring that any operation associated with another transaction upon which the compact data unit depends is applied prior to application of any operation associated with the compact data unit. The replication apply server application identifies and addresses any dependency arising due to compact units associated with the potential excessive memory transaction and/or compact units associated with other transactions being received out of order from the replication capture server system. At step 710, the replication apply server application sequentially applies the compact data unit to the at least one target database. According to step 710, the replication apply server application applies any database change associated with the compact data unit to one or more database tables among the at least one target database in sequence relative to other compact data units. At step 715, the replication apply server application logs the sequential application of the compact data unit in a potential excessive memory transaction apply log. The potential excessive memory transaction apply log includes data associated with compact data units applied to the at least one target database but yet to be committed. In an embodiment, the replication apply server application is capable of invoking rollback of one or more apply activities based upon the potential excessive memory transaction apply log. In a further embodiment, the replication apply server application optionally prunes the potential excessive memory transaction apply log upon committing the potential excessive memory transaction at step 615. Alternatively, the replication apply server application optionally retains one or more aspects of the potential excessive memory transaction apply log for reference during any future incident, e.g., for reference in the context of disaster recovery or in the context of application of a similar potential excessive memory transaction. According to such alternative, the replication apply server application optionally archives such one or more aspects, e.g., in an archived transaction apply log.

In sum, completing replication apply processing for each compact data unit among the at least one compact data unit associated with the potential excessive memory transaction according to the method 700 includes addressing any dependency associated with the compact data unit, sequentially applying the compact data unit to the at least one target database, and logging the sequential application of the compact data unit in a potential excessive memory transaction apply log including data associated with compact data units applied to the at least one target database but yet to be committed.

The descriptions of the various embodiments have been presented for purposes of illustration but are not intended to be exhaustive or limited to the embodiments disclosed. All kinds of modifications made to the described embodiments and equivalent arrangements should fall within the protected scope of the various embodiments. Hence, the scope should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein is chosen to best explain the principles of the various embodiments, the practical application or technical improvement over technologies found in the marketplace, or to enable others of ordinary skill in the art to understand the various embodiments.

What is claimed is:

1. A computer-implemented method of managing transaction size during a database replication process, the method comprising:
   identifying each of at least one transaction associated with at least one source database stored in a replication capture memory;
   identifying at least one potential excessive memory transaction by applying, via at least one machine learning pattern detection model, pattern detection to each of the at least one transaction stored in the replication capture memory;
   constructing at least one compact data unit associated with each of the at least one potential excessive memory transaction by determining a transaction split pattern for the potential excessive memory transaction and splitting the potential excessive memory transaction based upon the transaction split pattern; and facilitating compact data unit transmission to a replication apply server system in order to replicate the at least one compact data unit associated with each of the at least one potential excessive memory transaction to at least one target database via a replication apply server application.

2. The computer-implemented method of claim 1, wherein identifying the at least one potential excessive memory transaction comprises:

predicting, via a future operation prediction model among the at least one machine learning pattern detection model, a complete view of each of the at least one transaction stored in the replication capture memory, the complete view including at least one predicted operation;

determining, via a memory impact model among the at least one machine learning pattern detection model, a predicted incremental memory impact value for each of the at least one transaction stored in the replication capture memory based upon the complete view; and identifying any transaction among the at least one transaction stored in the replication capture memory as a potential excessive memory transaction responsive to determining that the predicted incremental memory impact value for the transaction exceeds an incremental memory impact threshold.

3. The computer-implemented method of claim 1, wherein the potential excessive memory transaction is split based upon the transaction split pattern only responsive to determining that a data size of the potential excessive memory transaction exceeds a predetermined data size threshold.

4. The computer-implemented method of claim 1, wherein determining the transaction split pattern for the potential excessive memory transaction comprises:

calculating similarity between at least one pattern associated with the potential excessive memory transaction and a plurality of historical transaction split patterns; and selecting as the transaction split pattern a pattern among the plurality of historical transaction split patterns having a highest calculated similarity with the at least one pattern associated with the potential excessive memory transaction.

5. The computer-implemented method of claim 1, wherein replicating the at least one compact data unit associated with each of the at least one potential excessive memory transaction to the at least one target database via the replication apply server application comprises:

creating a queue in a replication apply memory of the replication apply server system to link all compact data units among the at least one compact data unit associated with the potential excessive memory transaction;

completing replication apply processing for each compact data unit among the at least one compact data unit associated with the potential excessive memory transaction; and committing the potential excessive memory transaction upon applying to the at least one target database all compact data units among the at least one compact data unit associated with the potential excessive memory transaction.

6. The computer-implemented method of claim 5, wherein completing replication apply processing for each compact data unit among the at least one compact data unit associated with the potential excessive memory transaction comprises:

addressing any dependency associated with the compact data unit;

sequentially applying the compact data unit to the at least one target database; and logging the sequential application of the compact data unit in a potential excessive memory transaction apply log including data associated with compact data units applied to the at least one target database but yet to be committed.

7. A computer program product comprising a computer readable storage medium having program instructions embodied therewith for managing transaction size during a database replication process, the program instructions executable by a computing device to cause the computing device to:

identify each of at least one transaction associated with at least one source database stored in a replication capture memory;

identify at least one potential excessive memory transaction by applying, via at least one machine learning pattern detection model, pattern detection to each of the at least one transaction stored in the replication capture memory;

construct at least one compact data unit associated with each of the at least one potential excessive memory transaction by determining a transaction split pattern for the potential excessive memory transaction and splitting the potential excessive memory transaction based upon the transaction split pattern; and facilitate compact data unit transmission to a replication apply server system in order to replicate the at least one compact data unit associated with each of the at least one potential excessive memory transaction to at least one target database via a replication apply server application.

8. The computer program product of claim 7, wherein identifying the at least one potential excessive memory transaction comprises:

predicting, via a future operation prediction model among the at least one machine learning pattern detection model, a complete view of each of the at least one transaction stored in the replication capture memory, the complete view including at least one predicted operation;

determining, via a memory impact model among the at least one machine learning pattern detection model, a predicted incremental memory impact value for each of the at least one transaction stored in the replication capture memory based upon the complete view; and identifying any transaction among the at least one transaction stored in the replication capture memory as a potential excessive memory transaction responsive to determining that the predicted incremental memory impact value for the transaction exceeds an incremental memory impact threshold.

9. The computer program product of claim 7, wherein the potential excessive memory transaction is split based upon the transaction split pattern only responsive to determining that a data size of the potential excessive memory transaction exceeds a predetermined data size threshold.

10. The computer program product of claim 7, wherein determining the transaction split pattern for the potential excessive memory transaction comprises:

calculating similarity between at least one pattern associated with the potential excessive memory transaction and a plurality of historical transaction split patterns; and selecting as the transaction split pattern a pattern among the plurality of historical transaction split patterns having a highest calculated similarity with the at least one pattern associated with the potential excessive memory transaction.

11. The computer program product of claim 7, wherein replicating the at least one compact data unit associated with each of the at least one potential excessive memory transaction to the at least one target database via the replication apply server application comprises:

creating a queue in a replication apply memory of the replication apply server system to link all compact data units among the at least one compact data unit associated with the potential excessive memory transaction;

completing replication apply processing for each compact data unit among the at least one compact data unit associated with the potential excessive memory transaction; and committing the potential excessive memory transaction upon applying to the at least one target database all compact data units among the at least one compact data unit associated with the potential excessive memory transaction.

12. The computer program product of claim 11, wherein completing replication apply processing for each compact data unit associated with the potential excessive memory transaction comprises:

addressing any dependency associated with the compact data unit;

sequentially applying the compact data unit to the at least one target database; and logging the sequential application of the compact data unit in a potential excessive memory transaction apply log including data associated with compact data units applied to the at least one target database but yet to be committed.

13. A system comprising:

at least one processor; and a memory storing an application program, which, when executed on the at least one processor, performs an operation of managing transaction size during a database replication process, the operation comprising:

identifying each of at least one transaction associated with at least one source database stored in a replication capture memory;

identifying at least one potential excessive memory transaction by applying, via at least one machine learning pattern detection model, pattern detection to each of the at least one transaction stored in the replication capture memory;

constructing at least one compact data unit associated with each of the at least one potential excessive memory transaction by determining a transaction split pattern for the potential excessive memory transaction and splitting the potential excessive memory transaction based upon the transaction split pattern; and facilitating compact data unit transmission to a replication apply server system in order to replicate the at least one compact data unit associated with each of the at least one potential excessive memory transaction to at least one target database via a replication apply server application.

14. The system of claim 13, wherein identifying the at least one potential excessive memory transaction comprises:

predicting, via a future operation prediction model among the at least one machine learning pattern detection model, a complete view of each of the at least one transaction stored in the replication capture memory, the complete view including at least one predicted operation;

determining, via a memory impact model among the at least one machine learning pattern detection model, a predicted incremental memory impact value for each of the at least one transaction stored in the replication capture memory based upon the complete view; and identifying any transaction among the at least one transaction stored in the replication capture memory as a potential excessive memory transaction responsive to determining that the predicted incremental memory impact value for the transaction exceeds an incremental memory impact threshold.

15. The system of claim 13, wherein the potential excessive memory transaction is split based upon the transaction split pattern only responsive to determining that a data size of the potential excessive memory transaction exceeds a predetermined data size threshold.

16. The system of claim 13, wherein determining the transaction split pattern for the potential excessive memory transaction comprises:

calculating similarity between at least one pattern associated with the potential excessive memory transaction and a plurality of historical transaction split patterns; and selecting as the transaction split pattern a pattern among the plurality of historical transaction split patterns having a highest calculated similarity with the at least one pattern associated with the potential excessive memory transaction.

17. The system of claim 13, wherein replicating the at least one compact data unit associated with each of the at least one potential excessive memory transaction to the at least one target database via the replication apply server application comprises:

creating a queue in a replication apply memory of the replication apply server system to link all compact data units among the at least one compact data unit associated with the potential excessive memory transaction;

completing replication apply processing for each compact data unit among the at least one compact data unit associated with the potential excessive memory transaction; and committing the potential excessive memory transaction upon applying to the at least one target database all compact data units among the at least one compact data unit associated with the potential excessive memory transaction.

18. The system of claim 17, wherein completing replication apply processing for each compact data unit among the at least one compact data unit associated with the potential excessive memory transaction comprises:

addressing any dependency associated with the compact data unit;

sequentially applying the compact data unit to the at least one target database; and logging the sequential application of the compact data unit in a potential excessive memory transaction apply log including data associated with compact data units applied to the at least one target database but yet to be committed.

* * * * *